US012083488B2

(12) United States Patent
Johnson et al.

(10) Patent No.: US 12,083,488 B2
(45) Date of Patent: Sep. 10, 2024

(54) MOUNT FOR WATER CIRCULATOR

(71) Applicant: Kasco Marine, Inc., Prescott, WI (US)

(72) Inventors: Trevor Johnson, Prescott, WI (US); Travis Hilden, Prescott, MN (US)

(73) Assignee: KASCO MARINE, INC., Prescott, WI (US)

( * ) Notice: Subject to any disclaimer, the term of this patent is extended or adjusted under 35 U.S.C. 154(b) by 169 days.

(21) Appl. No.: 17/746,310

(22) Filed: May 17, 2022

(65) Prior Publication Data

US 2022/0297075 A1    Sep. 22, 2022

Related U.S. Application Data

(60) Provisional application No. 63/190,008, filed on May 18, 2021.

(51) Int. Cl.
| *B01F 35/41* | (2022.01) |
| *F16M 13/02* | (2006.01) |
| *B01F 101/00* | (2022.01) |
| *C02F 1/00* | (2023.01) |
| *C02F 103/00* | (2006.01) |

(52) U.S. Cl.
CPC ............. *B01F 35/41* (2022.01); *F16M 13/02* (2013.01); *B01F 2101/305* (2022.01); *C02F 1/006* (2013.01); *C02F 2103/007* (2013.01)

(58) Field of Classification Search
CPC ..... B01F 35/41; B01F 35/411; B01F 35/4111; B01F 2102/305; F16M 13/02; C02F 1/006; C02F 2103/007; F16B 7/1472
See application file for complete search history.

(56) References Cited

U.S. PATENT DOCUMENTS

| 4,576,501 | A | * | 3/1986 | McConnell ........... F16B 7/1472 |
| | | | | 403/104 |
| 10,392,763 | B2 | | 8/2019 | Stone |
| 2009/0256269 | A1 | | 10/2009 | Sun et al. |
| 2017/0335531 | A1 | | 11/2017 | Smothers et al. |

OTHER PUBLICATIONS

"All About Shaft Collars", Thomas Publishing Company, received by the Applicant on Jul. 27, 2022, 4 pages, available at https://www.thomasnet.com/articles/machinery-tools-supplies/all-about-shaft-collars/.
"Shaft Collars", MSC, received by the Applicant on Jul. 27, 2022, 1 page, available at https://dirxion.mscdirect.com/bigbook/2018/ (slide No. 3798).
"Aquasweep—Maintain a Healthy Aquatic Environment", Scott Aerator, 2021, 8 pages, available at https://www.manualslib.com/manual/1949778/Scott-Aerator-Aquasweep.html?page=2#manual.
Dock mount available from Kasco Marine, Inc., prior to May 18, 2021, 1 page.

* cited by examiner

*Primary Examiner* — Kyle Armstrong
(74) *Attorney, Agent, or Firm* — MERCHANT & GOULD

(57) ABSTRACT

A mount for a water circulator is described that is configured to control vertical adjustment and angular (or horizontal) adjustment of a water circulation assembly using independent mechanisms on the mount that mounts the water circulator to a support structure.

4 Claims, 3 Drawing Sheets

MOUNT FOR WATER CIRCULATOR

FIELD

This technical disclosure relates to a device for mounting a water circulator that is used to circulate water in a body of water or circulate liquid in a body of liquid.

BACKGROUND

A water circulator is used to create water circulation in a body of water to improve water quality and remove debris and sediment buildup.

SUMMARY

A mount for a water circulator is described that is configured to control vertical adjustment and angular (or horizontal) adjustment of a water circulation assembly using independent mechanisms on the mount that mounts the water circulator to a support structure.

The water circulator creates a continuous flow of water in a body of water including around marinas, areas around docks, and waterfronts. The continuous water circulation created by the water circulator helps to eliminate stagnant areas, remove weeds and debris and increase oxygen transfer, as well as prevent freezing of the water within the vicinity of the water circulator. In one embodiment, the water circulator described herein can be used in other bodies of liquid including, but not limited to, treatment tanks for water and/or chemicals for mixing the contents to keep solids and chemicals in suspension and evenly distributed.

In some instances, the vertical height and/or angular orientation of the water circulation assembly in the water need to be adjusted. Using independent mechanisms on the mount to control adjustment of the vertical height and the angular orientation facilitates such adjustments of the water circulation assembly compared to a mounting system where a single mechanism is used to control both vertical height and angular orientation.

In one embodiment, a water circulator mount of a water circulator can include a mounting plate configured to mount to a support structure, and a shaft mount bracket fixed to the mounting plate that is configured to be disposed around a support shaft of the water circulator. A first releasable lock mechanism is associated with the shaft mount bracket that is engageable with the support shaft. In addition, a collar is disposed above the shaft mount bracket and rests on an upper edge of the shaft mount bracket. A second releasable lock mechanism is associated with the collar that is engageable with the support shaft.

In another embodiment, a liquid circulator is described that is configured to create liquid circulation in a body of liquid. The liquid circulator includes a support tube having an upper end and a lower end. A liquid circulation assembly is mounted to the support tube at the lower end. The liquid circulation assembly includes a rotatable liquid propeller and an electric drive motor that is connected to the rotatable liquid propeller to rotate the rotatable liquid propeller. A mount structure is located between the upper end and the liquid circulation assembly and is configured to secure the support tube to a support structure. The mount structure includes a first mechanism that controls rotation of the support tube relative to the mount structure about a longitudinal axis of the support tube, and the mount structure includes a second mechanism separate from the first mechanism that controls vertical movement of the support tube relative to the mount structure in a direction parallel to the longitudinal axis.

DRAWINGS

DETAILED DESCRIPTION

Figure 1:
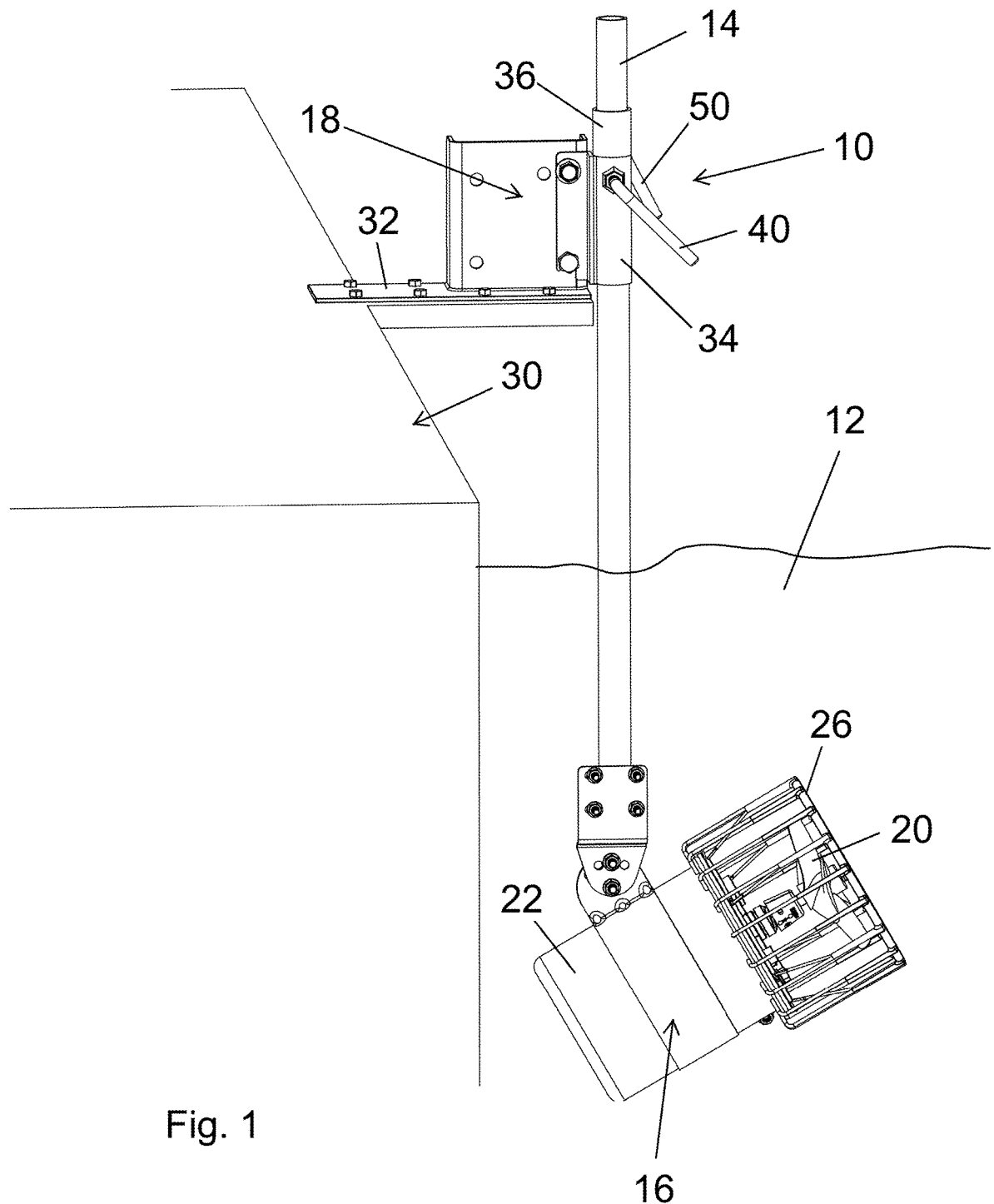
FIG. 1 is a perspective view of a water circulator and water circulator mount described herein.
Figure 2:
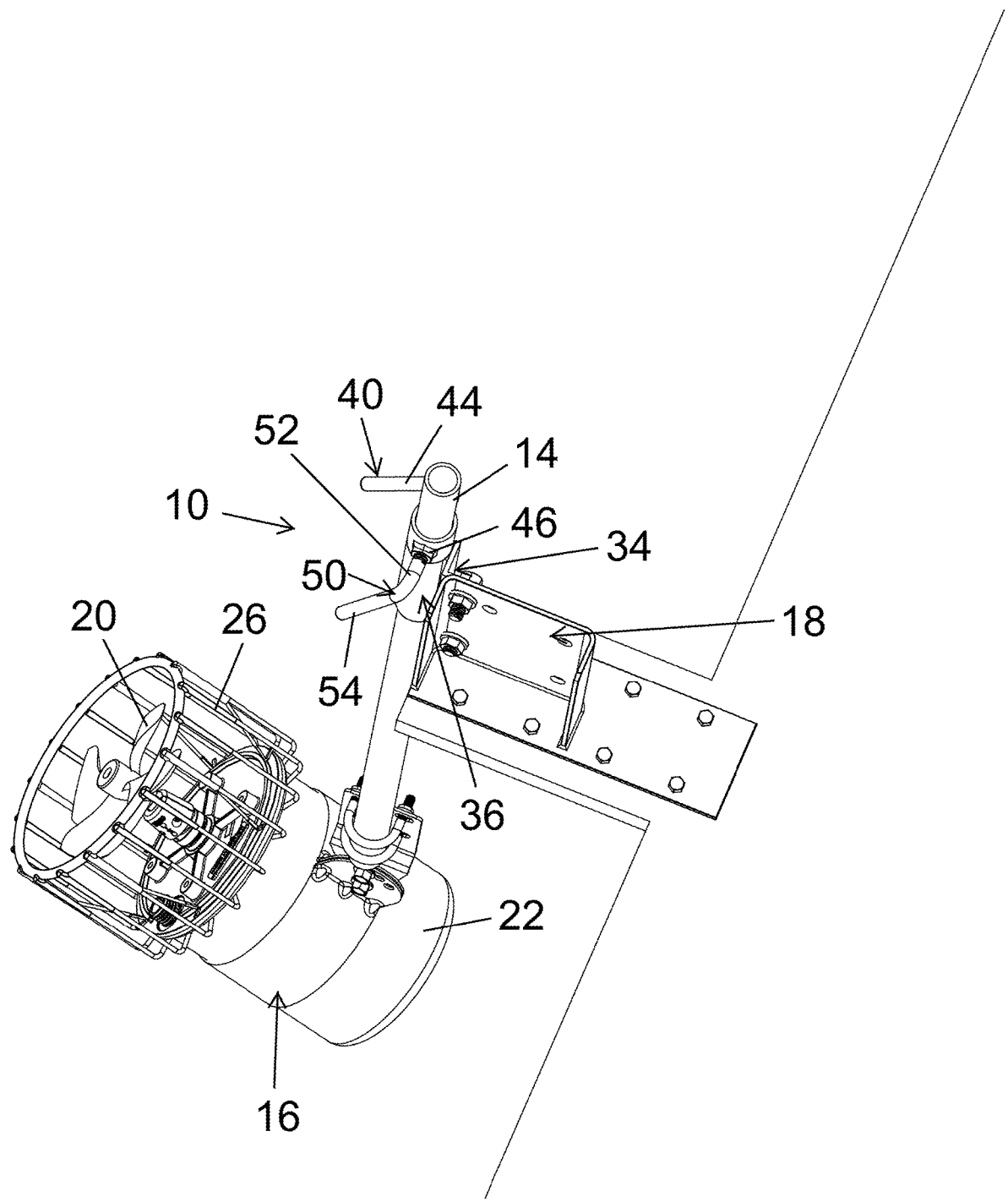
FIG. 2 is another perspective view of the water circulator and water circulator mount of FIG. 1.
Figure 3:
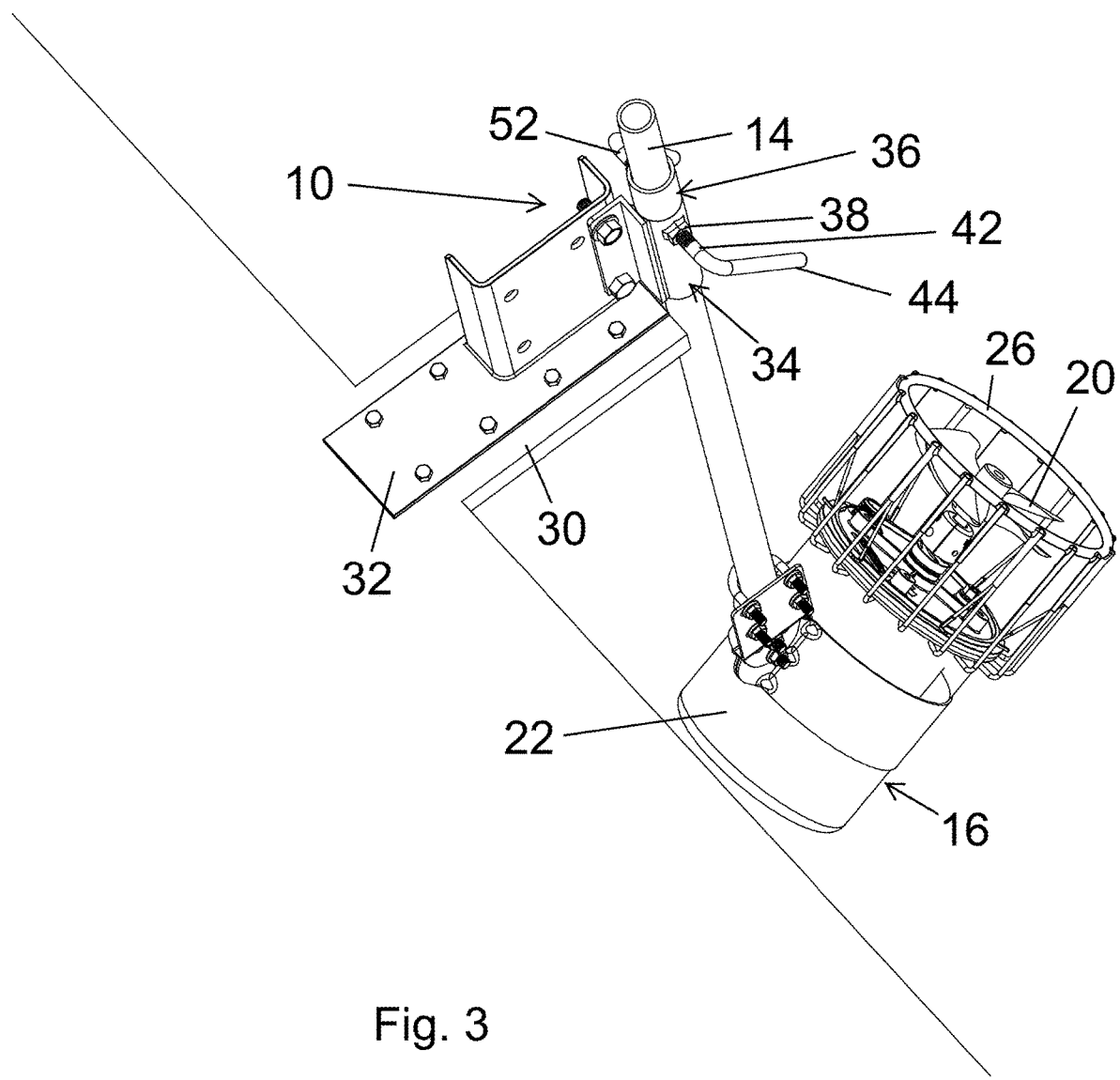
FIG. 3 is still another perspective view of the water circulator and water circulator mount of FIG. 1.

Referring to FIGS. 1-3, a water circulator 10 is illustrated. The water circulator 10 is configured to create a continuous circulation of water in a localized area of a body of water 12 such as a lake, pond, river, canal and the like. The localized area may be at or near a marina, around or adjacent to a dock, near a waterfront or other location, and other locations in a body of water. In one embodiment, the water circulator 10 can be used in other bodies of liquid to circulate liquids other than water or mixtures of water and other liquid(s) including, but not limited to, treatment tanks for water and/or chemicals for mixing the contents to keep solids and chemicals in suspension and evenly distributed, in which case the water circulator 10 may also be referred to as a liquid circulator.

With continued reference to FIGS. 1-3, the water circulator 10 includes a support tube 14, a water circulation assembly 16, and a water circulator mount 18. In operation of the water circulator 10, the water circulator 10 is mounted by the support tube 14 such that the water circulation assembly 16 is disposed within the water for creating circulation of the water.

The support tube 14 (or support shaft) has a solid or tubular configuration and has an upper end located out of the water and a lower end disposed in the water. The support tube 14 is stationary or fixed, i.e. the support tube 14 does not rotate during operation of the water circulation assembly 16, although the vertical height of the support tube 14 can be adjusted and the angular orientation of the support tube 14 and therefore of the water circulation assembly 16 can be adjusted. The support tube 14 may be circular in cross-section. The support tube 14 can be formed of material that is suitable for use in a water environment such as metal or plastic.

The water circulation assembly 16 is mounted to the lower end of the support tube 14. The water circulation assembly 16 is configured to generate a flow of water and includes a rotatable water propeller 20 and a drive motor 22 connected to the rotatable water propeller 20 to rotate the rotatable water propeller 20. The water propeller 20 can have any configuration that generates a flow of water when rotated. The flow of water generated by the water propeller 20 can be an axial flow of water that flows in a direction away from the drive motor 22. The drive motor 22 can be a one-way, electrically driven motor. Electrical power for powering the drive motor 22 can be provided by an electrical power cord (not shown) that in some embodiments can be routed through the support tube 14. In one embodiment, a propeller guard 26 can be provided around the water propeller 20 to protect against contact with the water propeller 20 and to prevent large debris from reaching the water propeller 20.

The water circulator mount 18 (or mount structure or dock mount) is connected to the support tube 14 for mounting the support tube 14, and thus the entire water circulator 10, to a support structure 30 such as, but not limited to, a dock or pier. The mount 18 includes a mounting plate 32 configured to mount to the support structure 30, a shaft mount bracket 34 and a collar 36.

The bracket 34 is fixed to the mounting plate 32 and is configured to surround at least a portion of the support tube 14. In the illustrated example, the bracket 34 has a cylindrical shape. In another embodiment, the bracket 34 can be square, triangular or have other shape in cross-section. In addition, the bracket 34 includes a first releasable lock mechanism associated with the bracket 34 that is engageable with the support tube 14. For example, in one embodiment, the first releasable lock mechanism can include a first threaded hole 38 that extends through the bracket 34, and a threaded lock handle 40 is threaded into the threaded hole 38. The lock handle 40 is L-shaped and includes a base 42 with a threaded end and a stem 44. The lock handle 40 is engageable with the support tube 14 via the threaded end of the base 42, and the stem 44 is used to rotate the lock handle 40 into and out of engagement with the support tube 14. The bracket 34 and the lock handle 40 form a first mechanism that in use is used to control rotation of the support tube 14 relative to the mount 18 about a longitudinal axis of the support tube 14. Other forms of first releasable lock mechanisms can be used.

The collar 36 is disposed above and is separate from the bracket 34. A bottom edge of the collar 36 rests on an upper edge of the bracket 34. In the illustrated example, the collar 36 has a cylindrical shape. In another embodiment, the collar 36 can be semi-cylindrical, square, triangular or have another shape in cross-section. The collar 36 includes a second releasable lock mechanism associated with the collar 36 that is engageable with the support tube 14. For example, in one embodiment, the second releasable lock mechanism can include a threaded hole 46 that extends through the collar 36, and a threaded lock handle 50 is threaded into the threaded hole 46. The lock handle 50 is L-shaped and includes a base 52 with a threaded end and a stem 54. The lock handle 50 is engageable with the support tube 14 via the threaded end of the base 52, and the stem 54 is used to rotate the lock handle 50 into and out of engagement with the support tube 14. The collar 36 and the lock handle 50 form a second mechanism that in use is used to control vertical movement of the support tube 14 relative to the mount 18 in a direction parallel to the longitudinal axis of the support tube 14. Other forms of second releasable lock mechanisms can be used.

In operation, to adjust the angular orientation of the water circulation assembly 16, the lock handle 40 is loosened so that the handle 40 is not engaged with the support tube 14, with the lock handle 50 of the collar 36 remaining engaged with the support tube 14. The support tube 14 can therefore be rotated which adjusts the angular orientation of the water circulation assembly 16 in the water. Because the collar 36 rests on the upper edge of the bracket 34 and is fixed to the support tube 14, the collar 36 prevents the support tube 14 from falling through the bracket 34. Rotation of the support tube 14 may be performed by a user grasping the lock handle 50 which acts as a handle for rotating the support tube 14. When the desired angular orientation is achieved, the lock handle 40 is rotated to bring the threaded end of the base 42 into engagement with the support tube 14 which locks the angular orientation.

To adjust the vertical height of the water circulation assembly 16 in the water, while the user grasps the upper end of the support tube 14, the lock handle 40 and then the lock handle 50 are loosened so that the handles 40, 50 are not engaged with the support tube 14. The user can then manually raise or lower the support tube 14 to adjust the vertical height of the water circulation assembly 16. Once the desired height is achieved, the handle 50 is rotated in to engage with the support tube 14 which locks the vertical height. Thereafter, the handle 40 can be rotated in to also engage with the support tube 14.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A water circulator mount of a water circulator, comprising:
   a mounting plate configured to mount to a support structure;
   a shaft mount bracket fixed to the mounting plate, the shaft mount bracket is configured to be disposed around a support shaft of the water circulator;
   a first releasable lock mechanism associated with the shaft mount bracket that is directly engageable with the support shaft;
   a collar disposed above the shaft mount bracket and resting on an upper edge of the shaft mount bracket;
   a second releasable lock mechanism associated with the collar that is directly engageable with the support shaft.

2. The water circulator mount of claim 1, wherein the shaft mount bracket has a cylindrical shape.

3. The water circulator mount of claim 1, wherein the collar has a cylindrical shape.

4. A liquid circulator for creating liquid circulation in a body of liquid, comprising:
   a support tube having an upper end and a lower end;
   a liquid circulation assembly mounted to the support tube at the lower end, the liquid circulation assembly includes a rotatable liquid propeller, and an electric drive motor connected to the rotatable liquid propeller to rotate the rotatable liquid propeller;
   a mount structure located between the upper end and the liquid circulation assembly and configured to secure the support tube to a support structure, the mount structure includes a first mechanism directly engaged with the support tube that controls rotation of the support tube relative to the mount about a longitudinal axis of the support tube, and the mount structure includes a second mechanism separate from the first mechanism and directly engaged with the support tube that controls vertical movement of the support tube relative to the mount structure in a direction parallel to the longitudinal axis.

* * * * *